United States Patent [19]
Kim

[11] Patent Number: 5,613,035
[45] Date of Patent: Mar. 18, 1997

[54] APPARATUS FOR ADAPTIVELY ENCODING INPUT DIGITAL AUDIO SIGNALS FROM A PLURALITY OF CHANNELS

[75] Inventor: Jong-Il Kim, Incheon, Rep. of Korea

[73] Assignee: Daewoo Electronics Co., Ltd., Seoul, Rep. of Korea

[21] Appl. No.: 367,521

[22] Filed: Dec. 30, 1994

[30] Foreign Application Priority Data

Jan. 18, 1994 [KR] Rep. of Korea ...................... 1994-784

[51] Int. Cl.$^6$ ........................................ G10L 9/00
[52] U.S. Cl. ................................... 395/2.38; 395/2.39
[58] Field of Search .................... 395/2, 2.38, 2.39, 395/2.35, 2.36, 2.37, 2.12; 341/50; 348/390; 381/2

[56] References Cited

U.S. PATENT DOCUMENTS

| | | | |
|---|---|---|---|
| 5,230,038 | 7/1993 | Fielder et al. | 395/2 |
| 5,285,498 | 2/1994 | Johnston | 381/2 |
| 5,331,414 | 7/1994 | Golin | 348/390 |
| 5,341,457 | 8/1994 | Hall, II et al. | 395/2.35 |
| 5,367,608 | 11/1994 | Veldhuis et al. | 395/2.38 |
| 5,491,773 | 2/1996 | Veldhuis et al. | 395/2.38 |
| 5,539,829 | 7/1996 | Lokhoff et al. | 381/2 |

OTHER PUBLICATIONS

Johnston, James D., "Transform Coding of Audio Signals Using Perceptual Noise Criteria," IEEE Journal On Selected Areas in Comms., vol. 6, No. 2, Feb. 1988, pp. 314–323.

Johnston, James D., "Estimation of Perceptual Entropy Using Noise Masking Criteria," IEEE, 1988, pp. 2524–2527.

Johnston, James D., "Perceptual Transform Coding of Wideband Stereo Signals," A1 a.4, 1989.

Primary Examiner—Benedict V. Safourek
Assistant Examiner—Ricky Q. Ngo
Attorney, Agent, or Firm—Anderson Kill & Olick P.C.

[57] ABSTRACT

A novel apparatus, capable of adaptively encoding input digital audio signals from N number of channels, includes N number of subband filters arranged in parallel for filtering the input digital audio signals, respectively, on a subband-by-subband basis; an estimator for estimating perceptual parameters for each subband, each frame and a frame group including N×M number of current and previous frames for the total N number of channels, which corresponds to the estimated perceptual entropies; a bit allocation unit for adaptively determining bits for the respective subbands of the frame group based on the estimated signal-to-mask ratio data, perceptual entropies, and mean and standard deviation parameters and for generating bit allocation information corresponding to the determined bits for the respective subbands of the frame group; N number of quantizers arranged in parallel for quantizing the filtered subband audio signals for the N number of channels in response to the corresponding bit allocation information generated for the respective subbands of the frame group; and a circuit for formatting the quantized digital audio signals together with the bit allocation information.

4 Claims, 2 Drawing Sheets

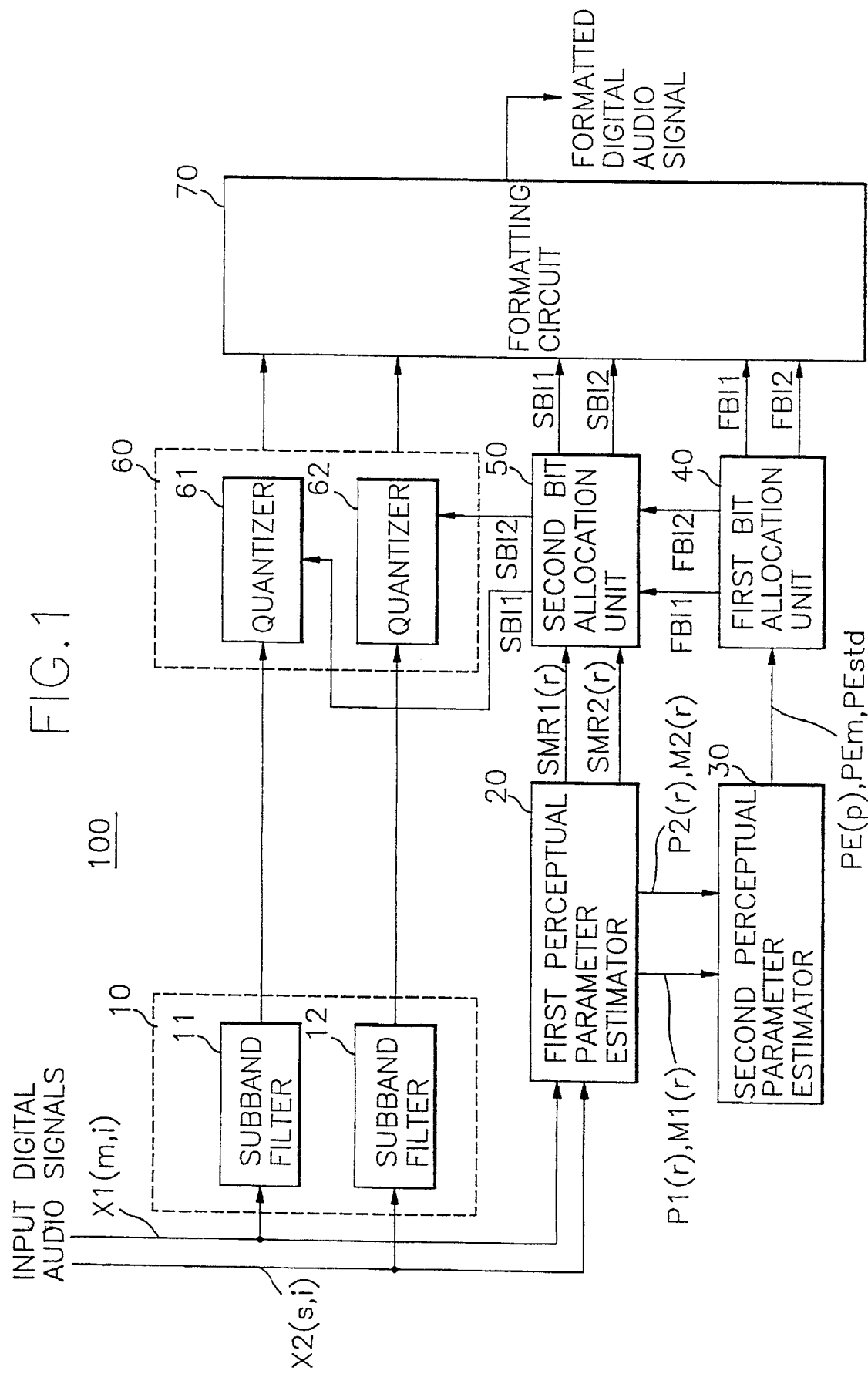

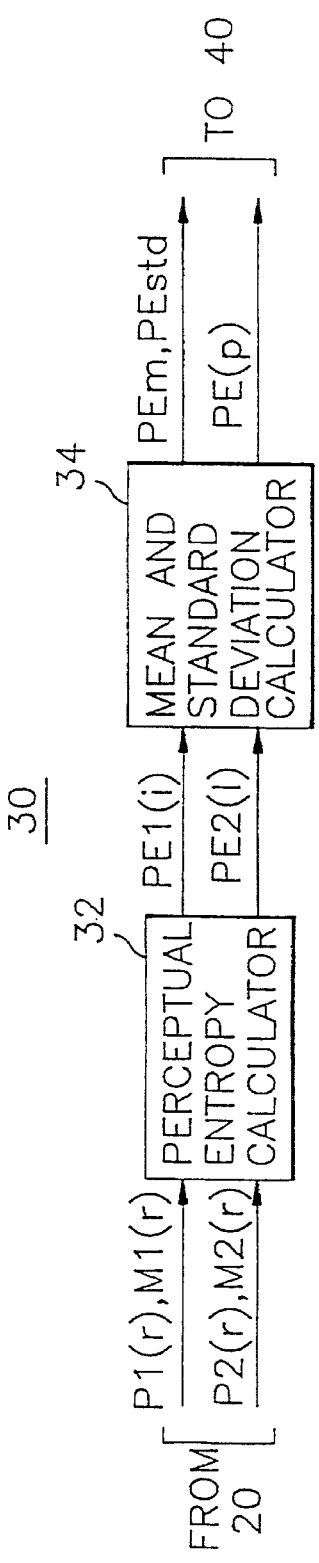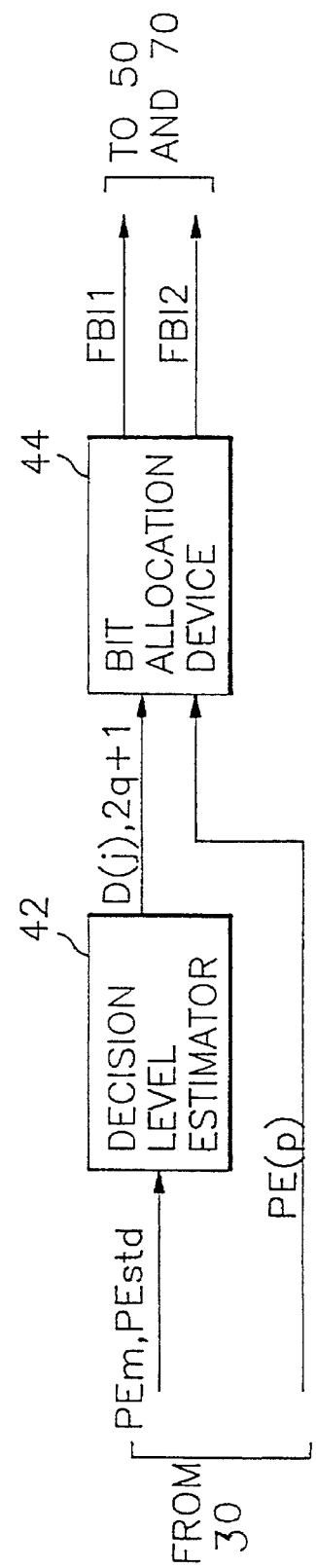

APPARATUS FOR ADAPTIVELY ENCODING INPUT DIGITAL AUDIO SIGNALS FROM A PLURALITY OF CHANNELS

FIELD OF THE INVENTION

The present invention relates to a digital audio encoding apparatus; and, more particularly, to an improved apparatus for adaptively encoding input digital audio signals from a plurality of channels based on a perceptual entropy for each of the input digital audio signals consistent with the human auditory perception.

DESCRIPTION OF THE PRIOR ART

Transmission of digitized audio signals makes it possible to deliver high quality audio signals comparable to those of a compact disc and/or a digital audio tape. When an audio signal is expressed in a digital form, a substantial amount of data need be transmitted especially in the case of high definition television system. Since, however, the available frequency bandwidth assigned to such digital audio signals is limited, in order to transmit the substantial amounts of digital data, e.g., 768 Kbps per channel for 16 bit PCM(Pulse Code Modulation) audio signal with 48 KHz sampling frequency, through the limited audio bandwidth of, e.g., about 128 KHz, it becomes inevitable to compress the digital audio data.

Among the various audio compression devices or techniques, the so-called MPEG(Moving Pictures Expert Group)-Audio algorithm, which employs a psychoacoustic algorithm, has been suggested for HDTV application.

The MPEG-Audio algorithm employs four primary parts of: subband filtering, psychoacoustic modeling, quantizing and coding, and frame formatting. The subband filtering is a process of mapping, from the time domain to the frequency domain, an input digital audio signal. A filterbank with B(e.g., 32) subbands may be used. In each subband, 12 or 36 samples are grouped for the processing thereof; and the grouped samples from said B subbands, i.e., D×12 or 36, constitute a "frame", which is a processing unit for the encoding, transmission and decoding of audio signals. The psychoacoustic modeling creates a set of data, e.g., SMR-(signal-to-mask ratio) data, for each subband or group of subbands to control the quantizing and coding thereof. Available bits are, then, adaptively allocated to each subband of the frame with reference to the SMR in the process of quantizing the subband samples. A frame formatter formats the quantized data together with other required side information in a suitable fashion for transmission.

In the above MPEG audio technique, however, since a fixed number of bits is allocated to each frame, it cannot afford to reflect such statistical properties as mean and standard deviations, and perceptual entropies of the input digital audio signal which may vary continuously among the frames. Further, in case where input digital audio signals having different perceptual entropies are provided to the conventional device using such prior art technique, it encodes the input digital audio signals without any regard to the perceptual entropies, resulting in a poor human auditory perception.

SUMMARY OF THE INVENTION

It is, therefore, a primary object of the invention to provide a novel apparatus capable of adaptively encoding input digital audio signals for a plurality of channels based on a perceptual entropy for each of the input digital audio signals, thereby enhancing the coding efficiency and the audio quality.

In accordance with the present invention, there is provided a novel apparatus for adaptively encoding input digital audio signals for N number of channels wherein each of the input digital audio signals includes a plurality of frames and each frame includes a plurality of subbands wherein N is a positive integer, which comprises: N number of subband filtering means arranged in parallel for receiving and filtering the input digital audio signals, respectively, on a subband-by-subband basis; first estimation means for estimating signal-to-mask ratio data, sound pressure levels and masking thresholds for the respective subbands included in each of the input digital audio signals; second estimation means for estimating perceptual entropies for the respective frames included in each of the input digital audio signals based on the estimated signal-to-mask ratio data, sound pressure levels and masking thresholds and for deriving a mean and a standard deviation parameters for a frame group including N×M number of current and previous frames for the total N number of channels, which corresponds to the estimated perceptual entropies wherein M is a positive integer; bit allocation means for adaptively determining bits for the respective subbands of the frame group based on the estimated signal-to-mask ratio data, perceptual entropies, and mean and standard deviation parameters and for generating bit allocation information corresponding to the determined bits for the respective subbands of the frame group; N number of quantizing means arranged in parallel for quantizing the filtered subband audio signals for the N number of channels in response to the corresponding bit allocation information generated for the respective subbands of the frame group; and means for formatting the quantized digital audio signals together with the bit allocation information.

BRIEF DESCRIPTION OF THE DRAWINGS

The above and other objects and features of the present invention will become apparent from the following description of preferred embodiments taken in conjunction with the accompanying drawings, in which:

FIG. 1 shows a block diagram schematically illustrating the novel apparatus for adaptively encoding input digital audio signals from a plurality of channels in accordance with the present invention;

FIG. 2 depicts a detailed block diagram of the second perceptual parameter estimator shown in FIG. 1; and FIG. 3 illustrates a detailed block diagram of the first bit allocation unit shown in FIG. 1.

DETAILED DESCRIPTION OF THE PREFERRED EMBODIMENTS

Referring to FIG. 1, there is shown a block diagram schematically illustrating an encoding apparatus 100 in accordance with the present invention.

The encoding apparatus 100 comprises a subband filtering device 10, first and second perceptual parameter estimators 20 and 30, first and second bit allocation units 40 and 50, a quantizing device 60 and a formatting circuit 70.

In the encoding apparatus 100, input digital audio signals X1(m,i) and X2(s,i) of ith frames(or current frames), received through N, e.g., 2, i.e., 1st(or L) and 2nd(or R) channels, are applied to the first perceptual parameter estimator 20 and the subband filtering device 10 wherein the respective input digital audio signals include M and S samples so that m=0, 1, 2, ..., M−1; s=0, 1, ..., S−1 and M and S are positive integers. A "frame" used herein denotes a part of the digital audio signal which corresponds to a fixed number of audio samples and is a processing unit for the encoding and decoding of the digital audio signal.

As shown, the subband filtering device 10 includes a plurality of subband filters, e.g., two subband filters 11 and 12, which are coupled in parallel in order to simultaneously receive the input digital audio signals of the current frames and carry out the filtering of the input digital audio signals from the 1st and the 2nd channels by employing a subband filtering technique well known in the art, e.g., the method disclosed in the so-called MPEG Audio Algorithm described in *ISO IEC JTC1/SC2/WG* 11, "Part 3. Audio proposal", CD-11172-3(1991). That is, each of the subband filters 11 and 12 serves to split the input digital audio signal with a sampling frequency $f_s$ into B, e.g., 32, equally spaced subbands with sampling frequencies of $f_s/B$ and provides the quantizing device 60 with the split subband audio samples.

On the other hand, the first perceptual parameter estimator 20 receives the input digital audio signals of the current frames from the 1st and the 2nd channels and performs to simultaneously estimate signal-to-mask ratio(SMR) data SMR1 and SMR2, sound pressure levels P1 and P2, and masking thresholds M1 and M2 for the respective subbands included in the current frames from the 1st and the 2nd channels by using a psychoacoustic model discussed in, e.g., the MPEG Audio Algorithm. The SMR1 for each subband from the 1st channel is obtained as:

$$SMR1(r)=P1(r)-M1(r) \quad \text{Eq. (1)}$$

wherein r is a subband index with r=0, 1, ..., B−1, B being the total number of subbands in a frame; SMR1(r), a signal-to-mask ratio in subband r of the 1st channel; P1(r), a sound pressure level in subband r of the 1st channel estimated from a FFT(Fast Fourier Transform) technique; M1(r), a masking threshold in subband r of the 1st channel; and SMR1(r), P1(r) and M1(r) are all in a dB(decibel) unit.

Similarly, the SMR2 for each subband from the 2nd channel may be derived as:

$$SMR2(r)=P2(r)-M2(r) \text{ dB} \quad \text{Eq. (2)}$$

wherein r has the same meaning as previously defined.

The masking threshold represents an audible limit which is a sum of the intrinsic audible limit or threshold of a sound and an increment caused by the presence of other tonal and non-tonal components of the audio signal. The signal-to-mask ratio data SMR1(r)'s and SMR2(r)'s of the 1st and the 2nd channels estimated at the first perceptual parameter estimator 20 are then fed to the second bit allocation unit 50, while the sound pressure levels P1(r)'s and P2(r)'s and the masking thresholds M1(r)'s and M2(r)'s of the 1st and the 2nd channels are coupled to the second perceptual parameter estimator 30.

The second perceptual parameter estimator 30 is adapted to estimate perceptual entropies PE1(i) and PE2(i) for ith(or current) frames of the 1st and the 2nd channels based on the sound pressure levels P1(r) and P2(r) and the masking thresholds M1(r) and M2(r) fed from the first perceptual parameter estimator 20, and derives a mean and a standard deviation parameters PEm and PEstd representative of statistical properties for a frame group including the current and its previous frames of the 1st and the 2nd channels based on the estimated perceptual entropies. Details of the second perceptual parameter estimator 30 will be described hereinafter with reference to FIG. 2.

The perceptual entropy of a pth frame included in the frame group, PE(p), and the mean and standard deviation parameters PEm and PEstd, estimated at the second perceptual parameter estimator 30 are then applied to the first bit allocation unit 40. The first bit allocation unit 40 serves to determine bits for each of the frames included in the frame group based on the perceptual entropy and the mean and standard deviation parameters from the second perceptual parameter estimator 30 and provides the second bit allocation unit 50 and the formatting circuit 70 with bit allocation information FB11 and FB12 corresponding to the determined bits for the respective frames of the 1st and the 2nd channels. Details of the first bit allocation unit 40 will be described hereinafter with reference to FIG. 3.

Referring to FIG. 2, there is shown a detailed block diagram of the second perceptual parameter estimator 30 shown in FIG. 1. The second perceptual parameter estimator 30 comprises a perceptual entropy calculator 32 and a mean and standard deviation calculator 34.

The perceptual entropy calculator 32 receives the sound pressure levels P1(r) and P2(r) and the masking thresholds M1(r) and M2(r) of the 1st and the 2nd channels fed from the first perceptual parameter estimator 20 shown in FIG. 1 and calculates perceptual entropies PE1(i) and PE2(i) for the ith frames of the 1st and the 2nd channels. The perceptual entropy PE1(i) for the ith frame of the 1st channel, as well known in the art, may be represented as:

$$PE1(i) = \frac{1}{B} \sum_{r=0}^{B-1} MAX\left[ 0, \frac{1}{2} \log_2 \frac{P1(r)}{M1(r)} \right] dB \quad \text{Eq. (3)}$$

wherein r, i and B have the same meanings as previously defined.

Similarly, the perceptual entropy PE2(i) for the ith frame of the 2nd channel, as well known in the art, may be represented as:

$$PE2(i) = \frac{1}{B} \sum_{r=0}^{B-1} MAX\left[ 0, \frac{1}{2} \log_2 \frac{P2(r)}{M2(r)} \right] dB \quad \text{Eq. (4)}$$

wherein r, i and B have the same meanings as previously defined.

Eqs. (3) and (4) can be obtained by applying the so-called rate distortion theory; and correspond to perceptual entropies based on the human auditory perception. The perceptual entropies for the ith frames of the 1st and the 2nd channels calculated at the perceptual entropy calculator 32 are then sent to the mean and standard deviation calculator 34.

The mean and standard deviation calculator 34 is adapted to group the calculated perceptual entropies, i.e., PE1(i−1) and PE1(i), and PE2(i−1) and PE2(i) for Q, e.g., 4, number of the current and its previous frames of the 1st and the 2nd channels, which are fed from the perceptual entropy calculator 32 in order to adaptively allocate bits among them in accordance with the processing of the first bit allocation unit 40 which will be described in details hereinafter with reference to FIG. 3; and calculates a mean and a standard deviation parameters representing their statistical properties by using the total perceptual entropies of the frame group. The mean parameter PEm for the total perceptual entropies of the frame group, as well known in the art, may be calculated as:

$$PEm = \frac{1}{Q} \sum_{p=0}^{Q-1} PE(p) \qquad \text{(Eq. (5))}$$

wherein p is a frame index used in the frame group with p=0, 1, ..., Q–1, Q being the total frame number of the frame group; and PE(p) represents a perceptual entropy of a pth frame in the frame group.

Accordingly, the standard deviation parameter PEstd for the total perceptual entropies of the frame group, as well known in the art, may be obtained as:

$$PEstd = \sqrt{\frac{1}{Q} \sum_{P=0}^{Q-1} [PE(p) - PEm]^2} \qquad \text{Eq. (6)}$$

wherein p and Q have the same meanings as previously defined.

The perceptual entropy of the pth frame, PE(p), and the mean and standard deviation parameters PEm and PEstd, grouped and calculated at the mean and standard deviation calculator 34, are then applied to the first bit allocation unit 40 shown FIG. 1.

Referring now to FIG. 3, there is shown a detailed block diagram of the first bit allocation unit 40 shown in FIG. 1. The bit allocation unit 40 comprises a decision level estimator 42 and a bit allocation device 44. The decision level estimator 42 is adapted to estimate optimal decision levels of the frame group for the bit allocation device 44 to adaptively allocate bits to each of the frames in the frame group, depending on the mean and standard deviation parameters PEm and PEstd from the mean and standard deviation calculator 34 shown in FIG. 2. In accordance with a preferred embodiment of the present invention, a jth decision level D(j) of the frame group may be obtained as:

$$D(j) = Pem + j \cdot PEstd \cdot W \qquad \text{Eq. (7)}$$

wherein j is a decision level index with j=–q to q, q being a positive integer, and W is a weight factor in the frame group.

As can be seen from Eq. (7), the level interval between the jth decision level D(j) and a (j–1)st decision level D(j–1) of the pth frame depends on both the standard deviation PEstd from the mean and standard deviation calculator 34 and a weight factor W of the frame group, while the total number, i.e., 2q+1, of decision levels is predetermined. The weight W of the frame group used in the decision level estimator 42 can be preferably determined by employing the mean and standard deviation parameters PEm and PEstd from the mean and standard deviation calculator 34 in order to derive the optimal decision levels of the frame group, which closely match the actual human auditory perception. In accordance with the present invention, the weight factor W of the frame group may be preferably obtained based on both the mean and standard deviation parameters PEm and PEstd representing statistical properties for the frame group as shown in Table 1:

TABLE 1

| | PEstd | | | |
|---|---|---|---|---|
| PEm | 0.0125– 0.125 | 0.126– 0.25 | 0.26– 0.375 | 0.376– |
| 0.15–0.63 | 10 | 0.5 | 0.25 | 0.125 |
| 0.64–1.26 | 100 | 1 | 0.5 | 0.25 |
| 1.27–1.89 | 1000 | 2 | 1 | 0.5 |

TABLE 1-continued

| | PEstd | | | |
|---|---|---|---|---|
| PEm | 0.0125– 0.125 | 0.126– 0.25 | 0.26– 0.375 | 0.376– |
| 1.90– | 1000 | 4 | 2 | 1 |

As can be seen from Table 1, if PEstd is less than a first predetermined threshold, e.g., 0.0125, and PEm is less than a 2nd predetermined threshold, e.g., 0.15, the weight factor W therein may be determined as 0; and, otherwise, it may be selected from any one of the weight factors referencing above Table 1. That is, a larger value of the weight factor W may be chosen if PEstd is relatively smaller and PEm is relatively larger, while a smaller value is selected if PEstd is relatively larger and PEm is smaller.

It should be appreciated that the number of decision levels, the thresholds Of the mean and standard deviation parameters and the weight factor can be preferably determined based on the required coding efficiency and audio quality of the encoding apparatus.

Subsequently, the decision level D(j) and the total number of the decision levels, i.e., 2q+1, which have been estimated and predetermined at the decision level estimator 42, and the perceptual entropy PE(p) from the mean and standard deviation calculator 34 shown in FIG. 2 are simultaneously provided to the bit allocation device 44.

The bit allocation device 44 determines bits for the respective frames in the frame group by using the decision levels and the total number of decision levels from the decision level estimator 42 and the perceptual entropy of the pth frame from the mean and standard deviation calculator 34 shown in FIG. 2, and provides the second bit allocation unit 50 and the formatting circuit 70 shown in FIG. 1 with the bit allocation information FB11 and FB12 corresponding to the determined bits for the respective frames of the 1st and the 2nd channels in the frame group. In a preferred embodiment of the present invention, the bit allocation FB(p) for the pth frame in the frame group may be determined as:

$$FB(p) = FBm + \frac{BV}{2q+1} \cdot I \qquad \text{(Eq. (8))}$$

wherein p has the same meaning as previously defined; FBm, mean bits, e.g., 3072 bits per frame for 16-bit PCM-(Pulse Code Modulation) audio data with 48 KHz sampling frequency at 128 Kbps data transmission rate per channel; BV, a predetermined bit variation value; 2q+1, the total number of predetermined decision levels; and I, a level index in the pth frame.

As can be seen from Eq. (8), the bit allocation of the pth frame, FB(p), can be determined by adding the number of mean bits, FBm, with the number of varied bits which can be derived from the second term thereof. The predetermined bit variation value BV therein may be determined as a value which is identical to the mean bits for one frame as defined in Eq. (8); and the level index I of the pth frame in the frame group can be obtained based on both the decision levels D(j)'s from the decision level estimator 42 and the perceptual entropy PE(p) from the mean and standard deviation calculator 34 shown in FIG. 2. In accordance with a preferred embodiment of the present invention, the level index I of the pth frame in the frame group may be represented as shown in Table 2(wherein it assumed that the interval of decision levels is 1.27 and the decision level index j is –2 to 2):

TABLE 2

| Range of decision level D | Level index (I) |
| --- | --- |
| ~ −2.56 | −2 |
| −2.55 ~ −1.28 | −1 |
| −1.27 ~ 1.26 | 0 |
| 1.27 ~ 2.54 | 1 |
| 2.55 ~ | 2 |

As can be seen from Table 2, if PE(p) exists between the decision levels −2.55 and −1.28, then the level index I may be selected as −1; and if PE(p) is between the decision levels −1.27 and 1.26, then the level index I can be chosen as 0, and so on. In this manner, the bit allocation FB(p) of the pth frame can be advantageously determined by employing Eq. (8).

Subsequently, the bit allocation information FB11 and FB12 of the 1st and the 2nd channels corresponding to the determined bits for respective frames of the frame group at the bit allocation device 44 and the signal-to-mask ratio data SMR1(r) and SMR2(r) from the first perceptual parameter estimator 20 shown in FIG. 1 are simultaneously supplied to the second bit allocation unit 50; and the bit allocation information FB11 and FB12 for respective frames are applied to the formatting circuit 70.

Referring back to FIG. 1, the second bit allocation unit 50 receives the signal-to-mask ratio data SMR1 and SMR2 fed from the first perceptual parameter estimator 20 and the bit allocation information FB11 and FB12 for respective frames supplied from the first bit allocation unit 40, determines bits for each subband included in each frame of the frame group, and provides bit allocation information SB11 and SB12 of the 1st and the 2nd channels corresponding to the determined bits for the respective subbands of the 1st and the 2nd channels to the quantizing device 60 and the formatting circuit 70, respectively. The principle used in the second bit allocation unit 50 lies in the optimization of the total mask-to-noise ratio data over a frame under the constraint that the number of bits used should not exceed the number of bits available for that frame transferred from the first bit allocation unit 40. Subsequently, the bit allocation information SB11 and SB12 for respective subbands of the 1st and the 2nd channels from the second bit allocation unit 50 and the split subband audio samples from each of the subband filters 11 and 12 are simultaneously fed to the quantizing device 60 which includes a plurality of quantizers, e.g., 61 and 62.

Each of the quantizers 61 and 62 serves to adaptively quantize corresponding split subband audio samples from each of the subband filters 11 and 12 based on its corresponding bit allocation information from the second bit allocation unit 50 and provides the quantized audio signal for each of the 1st and the 2nd channels to the formatting circuit 70.

At the formatting circuit 70, the quantized audio signal from each of the quantizers 61 and 62 and the bit allocation information from the first and second bit allocation units 40 and 50 are formatted and transmitted to a transmitter(not shown) for the transmission thereof, thereby improving the coding efficiency and the audio quality of the input digital audio signals from the 1st and the 2nd channels. The second bit allocation unit 50, the quantizers 61 and 62 and the formatting circuit 70 are basically identical to those which can be found in the MPEG Audio Algorithm.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for adaptively encoding input digital audio signals from N number of channels wherein each of the input digital audio signals includes a plurality of frames and each frame includes a plurality of subbands wherein N is a positive integer, which comprises:

N number of subband filtering means arranged in parallel for receiving and filtering the input digital audio signals, respectively, on a subband-by-subband basis;

first estimation means for estimating signal-to-mask ratio data, sound pressure levels and masking thresholds for the respective subbands included in each of the input digital audio signals;

second estimation means for estimating perceptual entropies for the respective frames included in each of the input digital audio signals based on the estimated signal-to-mask ratio data, sound pressure levels and masking thresholds and for deriving a mean and a standard deviation parameters for a frame group including N×M number of current and previous frames for the total N number of channels, which corresponds to the estimated perceptual entropies wherein M is a positive integer;

bit allocation means for adaptively determining bits for the respective subbands of the frame group based on the estimated signal-to-mask ratio data, perceptual entropies, and mean and standard deviation parameters and for generating bit allocation information corresponding to the determined bits for the respective subbands of the frame group;

N number of quantizing means arranged in parallel for quantizing the filtered subband audio signals for the N number of channels in response to the corresponding bit allocation information generated for the respective subbands of the frame group; and means for formatting the quantized digital audio signals together with the bit allocation information.

2. The apparatus as recited in claim 1, wherein said bit allocation means includes:

means for estimating decision levels of the frame group based on the estimated mean and standard deviation parameters;

first bit allocation means for determining bits for the respective frames of the frame group based on the estimated decision levels, the total number of decision levels, the perceptual entropies and predetermined mean bits and for generating bit allocation information corresponding to the determined bits for each of the frames; and second bit allocation means for determining bits for the respective subbands of each frame based on the estimated signal-to-mask ratio data and the generated bit allocation information, and for generating bit allocation information corresponding to the determined bits for each of the subbands.

3. The apparatus as recited in claim 2, wherein each of the decision levels of the frame group, D, is determined as:

$$D = PEm + j \cdot PEstd \cdot W$$

wherein j is a decision level index with j=−q to q, q being a positive integer, W is a weight factor in the frame group;

PEm is the mean parameter of the frame group; and PEstd is the standard deviation parameter of the frame group.

4. The apparatus as recited in claim 3, wherein the bit allocation for a pth frame, FB(p), is obtained as:

$$FB(p) = FBm + \frac{BV}{2q+1} \cdot I$$

wherein p is a frame index in the frame group; FBm, a function of mean bits for one frame; BV, a predetermined bit variation value; 2q+1, the total number of predetermined decision levels; and I, a level index in the pth frame.

* * * * *